United States Patent
Haimer

(10) Patent No.: US 9,010,183 B2
(45) Date of Patent: Apr. 21, 2015

(54) BALANCING MACHINE WITH AUTOMATIC INDEX MEASURING

(75) Inventor: Franz Haimer, Hollenbach (DE)

(73) Assignee: Franz Haimer Maschinenbau KG, Hollenbach (DE)

( * ) Notice: Subject to any disclaimer, the term of this patent is extended or adjusted under 35 U.S.C. 154(b) by 388 days.

(21) Appl. No.: 13/504,850

(22) PCT Filed: Oct. 29, 2010

(86) PCT No.: PCT/EP2010/066494
§ 371 (c)(1),
(2), (4) Date: Aug. 17, 2012

(87) PCT Pub. No.: WO2011/051460
PCT Pub. Date: May 5, 2011

(65) Prior Publication Data
US 2012/0304764 A1    Dec. 6, 2012

(30) Foreign Application Priority Data

Oct. 30, 2009  (DE) ..................... 20 2009 014 715 U
Dec. 4, 2009   (DE) ..................... 20 2009 016 532 U
Oct. 29, 2010  (WO) ................. PCT/EP2010/066494

(51) Int. Cl.
*G01M 1/00* (2006.01)
*G01M 1/16* (2006.01)

(52) U.S. Cl.
CPC ........................ *G01M 1/16* (2013.01)

(58) Field of Classification Search
CPC .......... G01M 1/01; G01M 1/04; G01M 1/16; G01M 1/20; G01M 1/22; G01M 1/24; G01M 1/32; G01M 1/045; G01M 1/225; G01M 1/326

USPC ........................... 73/458, 460, 462, 468, 471
See application file for complete search history.

(56) References Cited

U.S. PATENT DOCUMENTS

| | | | |
|---|---|---|---|
| 5,240,358 A * | 8/1993 | Hackett et al. ................ 409/141 |
| 5,965,815 A * | 10/1999 | Grim et al. ....................... 73/462 |
| 6,250,155 B1 * | 6/2001 | Hormann et al. ............... 73/462 |
| 6,354,151 B1 * | 3/2002 | Freyermuth et al. ............ 73/460 |
| 6,618,646 B1 * | 9/2003 | Dyer ............................. 700/279 |
| 7,318,346 B2 * | 1/2008 | Haimer .......................... 73/462 |
| 2011/0290017 A1 * | 12/2011 | Haimer .......................... 73/460 |
| 2012/0279286 A1 * | 11/2012 | Haimer ............................. 73/66 |

FOREIGN PATENT DOCUMENTS

| CA | 2493459 A1 | 2/2004 |
|---|---|---|
| DE | 10233917 A1 | 2/2004 |
| DE | 102007030916 B3 | 12/2008 |

* cited by examiner

*Primary Examiner* — Helen Kwok
(74) *Attorney, Agent, or Firm* — Setter Roche LLP

(57) ABSTRACT

The invention relates to a balancing machine for measuring the rotating unbalance of a tool holder in two different clampings, comprising a spindle which can be set into rotation. The spindle comprises an automatically actuatable coupling, by which the tool holder can be coupled rigidly to the spindle in a first position in order to rotate with the spindle around the rotational axis of the tool holder and the tool holder can be coupled rigidly to the spindle in a second position in order to rotate with the spindle around the rotational axis of the tool holder. The balancing machine also comprises at least one measuring sensor for determining the rotating unbalance of the tool holder rotating in the spindle unit, wherein the device has a brake which retains the tool holder.

10 Claims, 3 Drawing Sheets

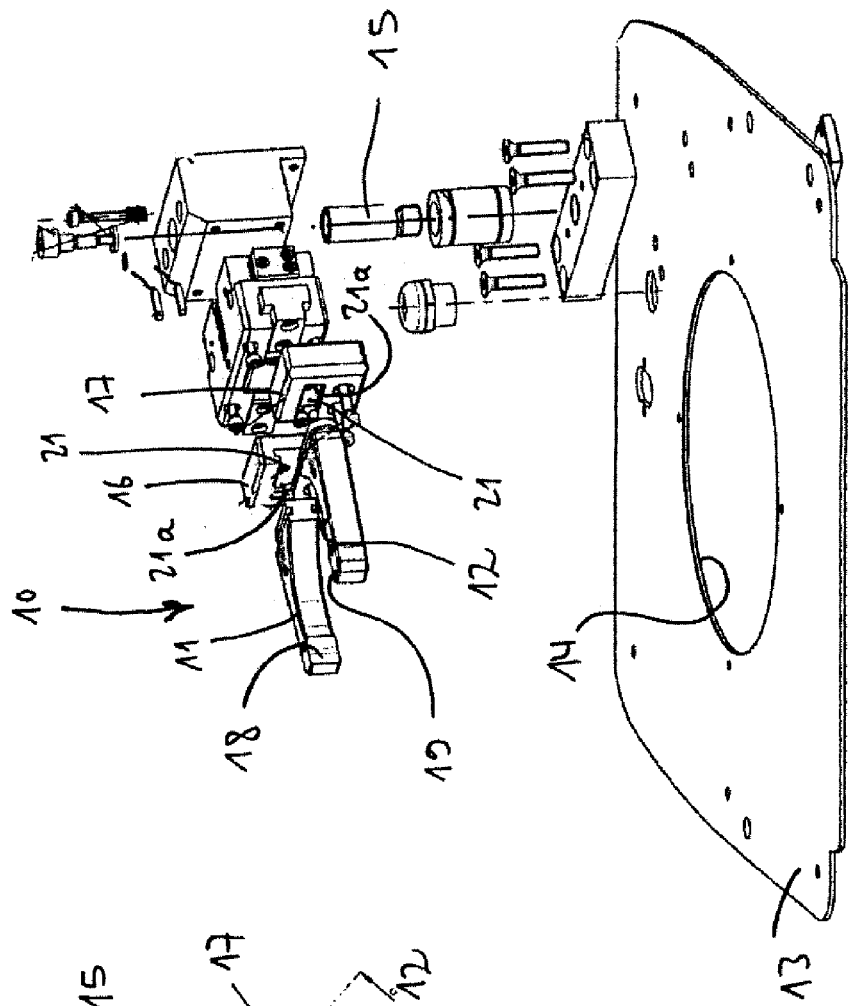
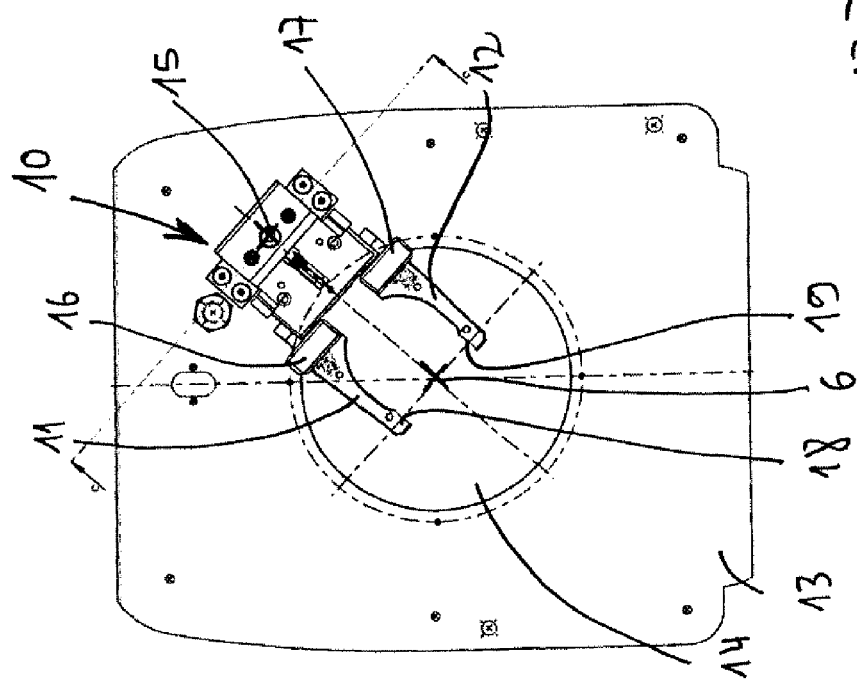
Fig. 4
Fig. 3

BALANCING MACHINE WITH AUTOMATIC INDEX MEASURING

FIELD OF THE INVENTION

The invention relates to a balancing machine.

BACKGROUND OF THE INVENTION

Cutting tools for modern machining centers are generally chucked in tool holders and connected to the work spindles of the machining centers by means of these tool holders. The concentricity of the unit consisting of the cutting tool and the tool holder is subject to high requirements. It is therefore common for the tool holders to be balanced after chucking a new tool.

Balancing takes place on balancing machines in which the tool holders are set into rotation together with the tool inserted into them. The forces generated by the still-present unbalance are recorded precisely and provide exact information with regard to the position and extent of the unbalance.

As standard, the tool holders are inserted into the spindle of the balancing machine and then set into rotation about their operating axis, whereupon a measurement is made once by which the extent and the position of the unbalance are then determined.

A so-called index measurement is made where the highest possible degree of precision is to be ensured in balancing.

Within the context of such an index measurement, the tool holder is installed into the spindle in a first position and then set into rotation by the spindle. In the process, a first measuring cycle is carried out. Then, the balancing machine is stopped and the tool holder is installed in the spindle in a second position, which is most frequently turned by 180 degrees relative to the spindle, which is generally done manually. The spindle is now set into rotation again and a second measuring cycle is carried out. With the measured values obtained in these two measuring cycles, the position and the extent of the unbalance can be determined particularly precisely.

The manual reinstallation is labor-intensive, time-consuming and, at least in some cases, also detrimental to precision. This becomes clear if one brings to mind the fact that, for various reasons, it may happen every now and then that the tool holder, due to being detached from the spindle and reinserted at a later point in time, does not come to lie quite in its ideal position anymore, which it had during the first measuring cycle, or vice versa.

In order to keep manpower requirements as low as possible, the idea has already been contemplated internally that the tool holders not be relocated manually, but that an industrial robot associated to the balancing machine be used for this purpose, which imitates the manual manipulation, but works more quickly and with greater precision. Whether this idea was already published somewhere else is not known to the applicant.

Be that as it may be, such a solution is disadvantageous because it requires great machine expenditure and because it cannot be ruled out completely also in this case that placement deviations of the tool holder occur during reinstallation. The use of an industrial robot associated with the balancing machine is also unsatisfactory with regard to cycle-time reduction because the arm of such an industrial robot loses a considerable amount of time during each cycle already due to the fact that it has to be driven towards the tool holder with a multi-axis movement and later retracted. Moreover, a robot arm with access from the outside requires the protection hood to be opened and closed again during each access, which also costs time or increases the machine expenditure.

In view of this, it is the object of the invention to provide a balancing machine by means of which an index measurement can be carried out quickly and with little effort.

SUMMARY OF THE INVENTION

The balancing machine according to the invention is characterized by the device comprising a brake that acts on the tool holder and is configured in such a way that, when the coupling is released, a relative movement between the tool holder and the spindle can be generated by the rotation of the spindle without the tool holder being removed completely from the spindle.

In some cases, the brake is even configured in such a way that the tool holder is not translationally moved at all relative to the spindle during the indexing, but that instead, it enforces a purely rotational movement of the tool holder relative to the spindle. In other cases, the brake is configured in such a way that it carries out a certain lifting movement (preferably between approx. $1/10$ mm and 1.5 mm, in some cases up to 15 mm) in the direction of the spindle rotation axis, in order to detach the tool holder from its seat in the spindle and thus reduce the friction forces between the tool holder and the spindle impeding a relative rotation, generally, however, without pulling the tool holder out of the spindle completely.

The basic idea is thus to briefly decouple the tool holder for the purpose of indexing in such a manner that it is no longer insuperably rigidly connected to the spindle, and to then retain it in such a way that the spindle, overcoming possible friction between the tool holder and the spindle, is able to continue to rotate by a predetermined amount.

The strength of the invention lies in the fact that only a minimum of movements needs to be carried out, and only small distances of movement have to be traveled in order to carry out indexing.

It becomes clear that the brake, too, is preferably configured in such a way that its moving parts only have to travel a short distance between the released position of the brake and the position of the brake applied to the tool holder.

Ideally, it is really only the twisting resistance of the connection between the tool holder and the spindle that is canceled, whereas the spindle otherwise continues to determine the position of the tool holder during indexing, i.e., the tool holder is not pulled out from its seat on the spindle for indexing. This reduces the danger of a placement error of the tool holder occurring simply because of the dismounting and subsequent reinstallation of the spindle.

Due to the fact that the brake according to the invention generally does not have to handle the tool holder as a whole, but merely has to prevent it from co-rotating with the spindle, the brake can be realized considerably lighter and thus with considerably less material expenditure than the multi-axis movable manipulator of an industrial robot.

Generally, the brake is configured very compact and attached in the direct vicinity of the spindle, so that it is accommodated completely under the protection hood that closes off the spindle from the surroundings during balancing.

Preferably, the brake is configured as a tong-like gripper that interacts with the tool holder by abutting against the circumference of the tool holder from two sides. In this manner, the tool holder can be prevented from co-rotating with the spindle without the spindle being subjected to appreciable lateral forces. Rather, the lateral forces that the two clamping jaws of the tong-like gripper generate cancel each other out.

Preferably, the gripper is disposed and configured in such a way that it is directly accessible to the machine operator without removing further covering parts when the safety hood is open, and it is disposed completely under the protection hood when the protection hood is closed. In this way, the user only needs to fold open the protection hood in order to be able to set up the tong-like gripper, for example to replace the clamping jaws, thus setting up the balancing machine for balancing a tool holder of a different kind.

Within the context of an advantageous development, it is provided that the gripper comprises a set of mutually interchangeable clamping jaws that are adapted, respectively in pairs, to the different contours of various tool holders. Preferably, the exchangeable clamping jaws, being designed accordingly, can be attached to the gripper and detached from it without any tools.

It thus becomes possible to perform measurements on tool holders with very different diameters and balance them without the gripper having to possess a large opening and closing stroke as would otherwise be required if one and the same gripper, in unmodified form, had to be able to grip and retain tool holders of various diameters.

Preferably, the gripper is pivotally mounted, relative to the tool holder, in such a way that the clamping jaws do not exert any substantial lateral force on the tool holder in the process of their abutting against the tool holder. Due to its pivoting capability, the gripper is capable of "centering" itself relative to the tool holder solely by closing its clamping jaws, so that each of the two clamping jaws abuts against the tool holder with substantially the same force. In this manner, the gripper is prevented from having an influence on the position of the tool holder because it is closing.

Ideally, the brake is disposed on a mounting plate which is attached in the vicinity of the spindle and has a cut-out section which leaves a feeding opening for the spindle free. In this manner, the brake constitutes a self-sufficient assembly that can be readily retrofitted in existing balancing machines also at a later point in time.

Further optional embodiments, modes of operation and advantages of the invention become apparent from the description of the following exemplary embodiments that is given with reference to various Figures.

BRIEF DESCRIPTION OF THE DRAWINGS

FIG. 3 shows a section from the FIG. 2 seen from the top, which again shows closer details of the brake according to the invention in the form of a tong-like gripper.

FIG. 4 shows further details of the brake according to the invention in the form of a tong-like gripper, which in this case is shown from the side in an exploded view.

DETAILED DESCRIPTION OF THE PREFERRED EMBODIMENTS

Figure 1:
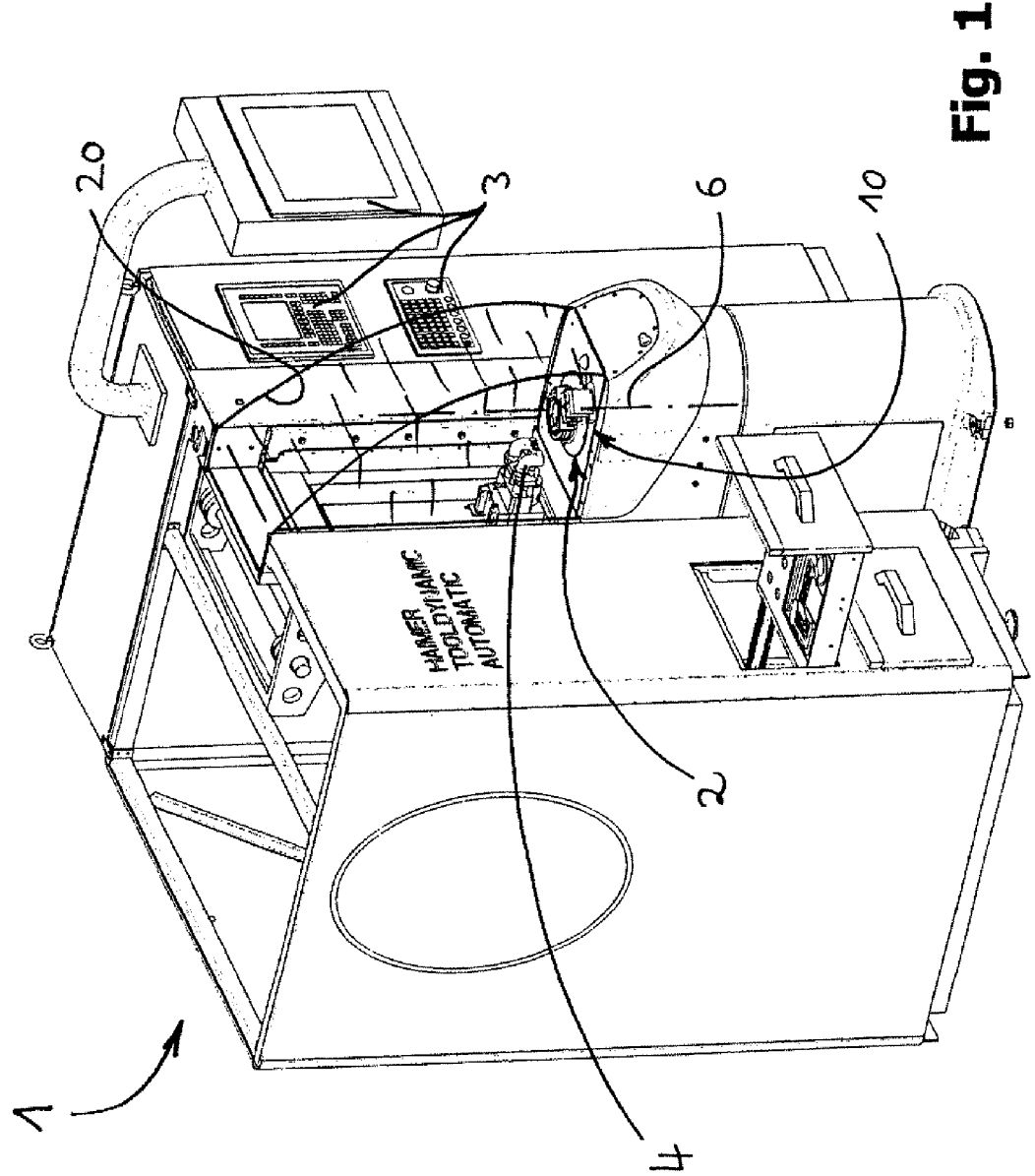
FIG. 1 shows a total view of a balancing station with a balancing machine according to the invention.

FIG. 1 shows a balancing station 1. This balancing station 1 consists of a housing into which, among other things, the actual balancing machine 2, various input and output units 3 and a drilling machine for removing material from the tool holder is integrated for balancing purposes. Of the drilling machine, only the extraction system 4 can be seen clearly here. It serves for removing chips released by every drilling process.

The actual balancing machine 2 is located in the housing part that projects outwards over the front of the rest of the housing in the manner of a table. Only the spindle 5 of the balancing machine 2 protrudes outwards out of the housing. During balancing, the spindle 5 rotates about the spindle rotation axis 6. The actual balancing machine 2 is preferably designed like the balancing machine described in detail by the U.S. Pat. No. 7,318,346. The aforementioned patent in its entirety is hereby incorporated into the subject matter of this intellectual property right.

Figure 2:
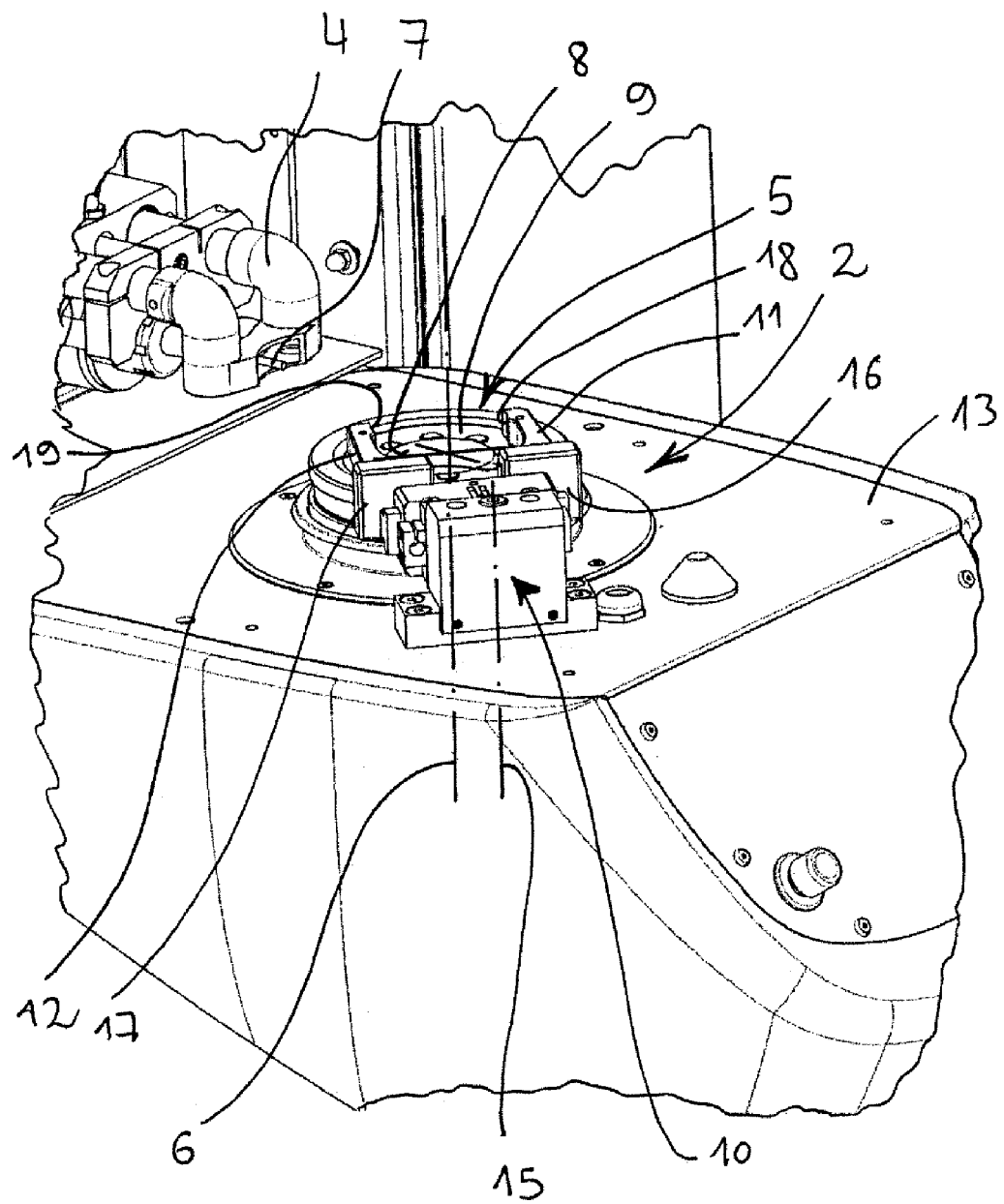
FIG. 2 shows a section from the FIG. 1, which shows closer details of the balancing machine according to the invention.

FIG. 2 shows a section of the balancing machine 2 in close-up. The spindle 5, its spindle rotation axis 6 and the surroundings of the spindle 5 can be seen clearly here. Once again, and a little more clearly, the extraction system 4 can be seen from which the drill 7 protrudes.

The spindle clamping system, which is disposed inside and therefore cannot be seen in FIG. 2, and which serves for connecting the tool holder to the spindle, is preferably configured as described by the international patent application WO 00/45983. The aforementioned patent application in its entirety is hereby incorporated into the subject matter of this intellectual property right.

The tool holder to be measured and balanced is inserted into the spindle opening 8 from above and then fixed on the spindle 5, for example as it is shown by FIG. 1 of the aforementioned international patent application. In this case, the tool holder, which is not shown in the Figures (but compare WO 00/45983, FIG. 1), generally comprises a radially extending circular ring area with which the tool holder is placed on the upper end face 9 of the spindle. Moreover, it comprises a conical section with which it protrudes into a complementary conical seat of the spindle 5 that has a centering effect. A coupling that is configured in the form of a collet chuck and that draws the tool holder downwards against the spindle, fixing it thereon by frictional fit, engages into the opening of the tool holder enclosed by this conical seat. As long as the collet chuck does not exert any tensile force, the tool holder is held in position by the spindle 5 but can be rotated relative to the spindle 5 once the corresponding frictional forces are overcome.

A brake 10 is provided in order to be able to carry out the index measurement automatically and without any further intervention by the machine operator. The tool holder can be retained by means of this brake while the spindle motor rotates the spindle 5 further by an amount predetermined by the machine control (generally half a spindle rotation).

In the present exemplary embodiment, the brake 10 is configured as a tong-like gripper that is equipped with two clamping jaws 11, 12. In the opened state, the clamping jaws 11, 12 are moved apart to such an extent that the tool holder can be inserted between the clamping jaws into the spindle opening 8 and pulled out of it again unimpeded. In the closed state, the clamping jaws abut against the circumference of the tool holder at two diametrically opposite places and prevent the tool holder from rotating further together with the spindle. In the simplest case, the tong-like gripper, apart from the movement with which it opens and closes its clamping jaws, is configured to be completely immovable and thus designed to be as simple and reliable as it is inexpensive, which does not rule out, within the sense of optional additional equipment, that it is capable of lifting the tool holder a bit.

FIG. 1 indicates that the area above the spindle 2 is covered by a protective cover 20 that is opened only for inserting and removing the respective tool holder. The point is that the brake 10 is configured to be so compact that it can be disposed within the area enclosed by the protective cover 20. Due to this, the brake 10 can be actuated without having to open and close the protective cover again for this purpose. This simplifies handling and above all saves time.

FIGS. 3 and 4 show the details of the brake 10, which in this case is configured in the form of a tong-like gripper.

As FIG. 4, in particular, shows, the tong-like gripper is mounted on a mounting plate 13 that, with its opening 14, can be "put over" the spindle 5, which protrudes out of the rest of the housing, and attached in the vicinity of the spindle for the purpose of retrofitting existing balancing machines. In this case, the tong-like gripper, in the case of the exemplary embodiment shown here, is attached to the mounting plate 13 so as to be pivotable about the gripper axis 15 so that the tong-like gripper is able to "center" itself relative to the spindle or the spindle seat. This is important in particular for those versions in which the gripper is provided with a lifting function, by means of which the tool holder can be lifted by a little amount in order to detach the tool holder from its seat in the spindle. In this case, a preferably pneumatically actuatable cylinder can be mounted coaxially with the gripper axis 15, by means of which the occasionally relatively high forces can be raised that are necessary in order to detach the tool holder from its seat in the spindle—with the cylinder at the same time optionally also ensuring pivotability about the gripper axis 15.

What is remarkable is that the gripper does not require any external drive system, save for closing its clamping jaws and possibly for lifting the tool holder.

As can be seen in FIG. 3, the clamping jaws are provided with clamping surfaces 18 and 19 which are adapted to the respective tool holder and with which they abut against the tool holder at, relative to the spindle rotation axis 6, two diametrically opposite places, with the clamping surfaces 18 and 19 preferably being situated symmetrically relative to the spindle rotation axis 6.

In FIG. 4, it can be seen that the clamping jaws are replaceable in this exemplary embodiment—the ends of the clamping jaws facing away from the tool holder are configured in such a way that they can be inserted in a positive fit into the sockets 21 provided for this purpose on the movable actuator plates 16, 17, preferably in such a way that due to the closing of the clamping jaws they are pressed against the end 21a of the sockets 21 that are in this case formed by grooves. Such a replaceability of the clamping jaws has the great advantage that the tong-like gripper, though it only carries out a very small opening and closing stroke, is able to fix tool holders with various diameters.

The unbalance measurement is carried out as follows:

The tool holder is inserted into the spindle 5 as described above. The coupling in the form of the collet chuck is tightened and draws the tool holder against the spindle 5 so that the former is fixed in the spindle 5 by frictional and/or positive fit. The spindle and the tool holder together are set in rotation; a first measuring cycle takes place in which the position and the amount of the unbalance are determined for a first time.

Then the spindle drive is switched off and the spindle is brought to a standstill. Now, the brake 10 in the form of the tong-like gripper is activated. This is done by the clamping jaws being pressed against the corresponding surfaces on the circumference of the tool holder. Then the tensile force exerted by the collet chuck is canceled, so that the tool holder is no longer drawn towards the spindle so as to be non-rotatable, but rests in the sockets of the spindle 5 only due to its own weight. As an alternative, a brake that becomes effective by a positive fit is also possible, e.g. in the form of a pawl that latches into a recess of the rotor.

Optionally, the brake 10 in the form of a tong-like gripper can be configured in such a way that it now lifts the tool holder by a small amount in order to detach the tool holder relative to the seat in the spindle and to reduce the frictional forces between the tool holder and the seat in the spindle. However, in other cases the tong-like gripper is configured and dimensioned in such a way that it is able to prevent the tool holder from co-rotating without such a lifting process being carried out previously, so that the indexing can take place without the tool holder having been completely detached from its seat relative to the spindle. Alternatively, the clamping system could also be configured in such a way that it lifts the tool slightly during the detachment process in order to cancel the frictional fit.

Given a positive clamping, the tool can be lifted to an extent where the positive-fit elements come out of engagement.

Thereupon, the spindle drive is reactivated and the spindle is rotated by an amount determined by the machine control. Since the tool holder is prevented from co-rotating by the brake 10, the tool holder and the spindle twist relative to one another by a certain extent. Then, tensile force is again applied to the collet chuck so that the tool holder is non-rotatably fixed to the spindle 5 again.

The spindle and the tool holder are now set into rotation together again. In the process, a second measuring cycle takes place in which the position and the amount of the unbalance are determined for a second time.

Subsequent thereto, the tool holder is balanced. Preferably, the machine's own drilling machine is activated for this purpose, which introduces an bore hole into the tool holder at the appropriate place, thus removing material in the extent necessary for balancing.

It is thus possible by means of the invention to provide balancing machine which works fully automatically and which, without the intervention by the operator and with little machine expenditure, carries out a balancing with an index measurement. The user only has to input the type of tool holder that he wishes to have measured and balanced, then insert this tool holder into the machine and later remove it again from the machine.

In less expensive balancing machines of the type according to the invention, the place at which the operator has to attach a balancing weight (for example by screwing a headless screw into a thread already provided at the tool holder for this purpose) is indicated to him by means of a light mark (most frequently laser), and he is given the information via the display what the mass is that the balancing weight needs to have, i.e., from which of the different weight classes he has to select the headless screw that is to be screwed in.

Optimally, the brake is configured in such a way that it can be removed (generally completely) from the balancing machine, so that the balancing machine can be used without any problems also for balancing very flat rotors which would other wise interfere with the brake with regard to space. Preferably, the brake and/or the balancing machine are configured in such a way that they enable the removal of the brake without any tools.

Generally, the balancing machine according to the invention is especially designed for balancing tool holders. If required, however, its design can also be applied in an analogous manner to machines in which items other than tool holders are being balanced, which is hereby pointed out to the person skilled in the art.

The invention claimed is:

1. A balancing machine for measuring a rotating unbalance of a tool holder in two different clampings to achieve an index measuring, comprising:

a spindle, which can be set into rotation and has an automatically actuatable coupling, which firmly couples a tool holder to the spindle in a first position in order to rotate about an axis of the spindle together with the spindle in a first measurement cycle, and firmly couples the tool holder to the spindle in a second position in order to rotate about its axis together with the spindle in a second measurement cycle;

at least one sensor for determining a rotating unbalance of the tool holder rotating in a spindle unit; and a brake which retains the tool holder and is configured in such a way that, when the coupling is released, a defined relative movement between the tool holder and the spindle can be generated by the rotation of the spindle without the tool holder being removed completely from the spindle.

2. The balancing machine according to claim 1, wherein the balancing machine comprises a safety hood and the spindle and the brake are configured and positioned relative to one another in such a way that the brake can operate as intended without the safety hood having to be lifted in order to have the brake operate.

3. The balancing machine according to claim 1, wherein the brake is formed of a tong-like gripper that interacts with the tool holder by abutting against a circumference of the tool holder from two sides.

4. The balancing machine according to claim 3, wherein the gripper is disposed in such a way that the gripper is accessible to a machine operator when a safety hood is open, and that the gripper is disposed completely under the safety hood when the safety hood is closed.

5. The balancing machine according to claim 3, wherein the gripper comprises a set of mutually interchangeable clamping jaws that are adapted, respectively in pairs, to different contours of various tool holders.

6. The balancing machine according to claim 5, wherein the gripper is pivotally mounted, relative to the tool holder, in such a way that the clamping jaws do not exert any substantial lateral force on the tool holder in the process of the clamping jaws abutting against the tool holder.

7. The balancing machine according to claim 1, wherein the brake is disposed on a mounting plate which is attached in a vicinity of the spindle and has a cut-out section which leaves at least one feeding opening for the spindle free.

8. The balancing machine according to claim 1, wherein the brake acts on the tool holder by positive fit.

9. The balancing machine according to claim 1, wherein a frictional and/or positive fit of the tool holder in relation to the spindle is canceled by the tool holder being lifted by the brake.

10. The balancing machine according to claim 1, wherein a frictional and/or positive fit of the tool holder in relation to the spindle is canceled by the tool holder being lifted also by or only by a clamping system retaining the tool holder in relation to the spindle.

* * * * *